(12) United States Patent
Oh

(10) Patent No.: US 7,932,985 B2
(45) Date of Patent: Apr. 26, 2011

(54) LIQUID CRYSTAL CELL AND METHOD OF MANUFACTURING THE SAME

(75) Inventor: Dong Ki Oh, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 287 days.

(21) Appl. No.: 12/104,587

(22) Filed: Apr. 17, 2008

(65) Prior Publication Data

US 2008/0297715 A1  Dec. 4, 2008

(30) Foreign Application Priority Data

May 30, 2007  (CN) .......................... 2007 1 0099781

(51) Int. Cl.
*G02F 1/1339* (2006.01)
(52) U.S. Cl. .......................... 349/157; 349/156; 349/187
(58) Field of Classification Search .................. 349/155, 349/156, 157, 187; 430/7, 321
See application file for complete search history.

(56) References Cited

U.S. PATENT DOCUMENTS

| | | | | |
|---|---|---|---|---|
| 5,991,000 A | * | 11/1999 | Shimabukuro et al. | 349/155 |
| 6,788,378 B2 | * | 9/2004 | Yi | 349/155 |
| 2002/0154264 A1 | * | 10/2002 | Suzuki | 349/153 |
| 2002/0171800 A1 | * | 11/2002 | Miyazaki et al. | 349/156 |
| 2003/0025868 A1 | * | 2/2003 | Hiroshima et al. | 349/156 |
| 2004/0114087 A1 | * | 6/2004 | Cho et al. | 349/155 |
| 2005/0036094 A1 | * | 2/2005 | Tamatani et al. | 349/153 |
| 2005/0243261 A1 | * | 11/2005 | Chiang et al. | 349/155 |
| 2006/0203178 A1 | | 9/2006 | Cho et al. | |
| 2007/0103635 A1 | * | 5/2007 | Tawaraya et al. | 349/156 |
| 2008/0018835 A1 | * | 1/2008 | Li et al. | 349/106 |

* cited by examiner

*Primary Examiner* — Dung T. Nguyen
*Assistant Examiner* — Tai Duong
(74) *Attorney, Agent, or Firm* — Hasse & Nesbitt LLC; Daniel F. Nesbitt

(57) ABSTRACT

Provided are a liquid crystal cell of a liquid crystal display and a method of manufacturing the same, comprising spacers disposed between a color filter substrate and an array substrate, wherein the color filter substrate comprises a central area and a peripheral area, and the spacers provided in the peripheral area are higher than those provided in the central area. The embodiments of the present invention can effectively prevent the occurrence of the gravity mura, the peripheral mura, and the gap mura to improve the display quality.

19 Claims, 3 Drawing Sheets

LIQUID CRYSTAL CELL AND METHOD OF MANUFACTURING THE SAME

FIELD OF THE INVENTION

The present invention relates to a liquid crystal display (LCD), and in particular, to a liquid crystal cell of a liquid crystal display and a method of manufacturing the same.

BACKGROUND OF THE INVENTION

Recently, liquid crystal displays (LCDs) have become the main stream in the flat display area. The LCDs use the principle that the alignment of liquid crystal molecules can be controlled with externally applied electric field due to the dielectric anisotropy and conductive anisotropy of the liquid crystal molecules, so that the liquid crystal thin film can give rise to various photoelectric effects.

The panel of a typical thin film transistor liquid crystal display (TFT-LCD) comprises a TFT array substrate and color filter substrate arranged in parallel to each other. Spacers are interposed between the two substrates to provide a space for filling liquid crystal between the two substrates, and the peripheral areas around the display area of the two substrates are bonded together with adhesive so as to obtain a liquid crystal cell of the liquid crystal display.

The spacers may be ball spacers that are distributed, for example, on the color filter substrate, or may be column spacers that formed, for example, on the color filter substrate by a photolithographic method. In the photolithographic method, photo resist is coated on the color filter substrate and then exposed with a mask and developed to obtain the column spacers.

When a LCD operates in a high temperature, the liquid crystal molecules may be displaced with gravity field, causing gravity mura phenomenon and degrading display quality of the LCD. Mura phenomenon refers to partially or entirely non-uniform chrominance in the image displayed by the LCD.

Furthermore, during the course that liquid crystal is filled into a liquid crystal cell in manufacturing, if the liquid crystal builds up excessively in the peripheral areas, it may lead to peripheral mura phenomenon, and in the worse case large-area light leakage may occur in lower portion of the LCD.

SUMMARY OF THE INVENTION

In view of the above problems in the related art, the present invention is to provide a liquid crystal cell of a LCD, which can effectively prevent the gravity mura and the peripheral mura phenomenon occurring in a conventional LCD.

One aspect of the present invention provides a liquid crystal cell of a liquid crystal display, comprising spacers disposed between a color filter substrate and an array substrate, wherein the color filter substrate comprises a central area and a peripheral area, and the spacers provided in the peripheral area are higher than those provided in the central area.

Another aspect of present invention provides a method for manufacturing a liquid crystal cell of a liquid crystal display, comprising providing spacers between a color filter substrate and an array substrate, wherein the color filter substrate comprises a central area and a peripheral area, and the spacers are formed in the peripheral area higher than those formed in the central area.

In the embodiments of the present invention, a liquid crystal cell of a liquid crystal display having the spacers with different heights. In the central area and the peripheral area of the color filter substrate, the spacers provided in the peripheral area are higher than those provided in the central area, therefore liquid crystal can be prevented from excessively building up in the peripheral area and the liquid crystal can be prevented from being displaced by the gravity field, so as to effectively prevent occurrence of the peripheral mura and the gravity mura phenomenon and improve display quality of the liquid crystal display. In addition, the method of controlling the height difference of the spacers may be performed, for example, through a mask process by adjusting the diameters of the openings in a mask plate for the spacers to be formed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Figure 1:
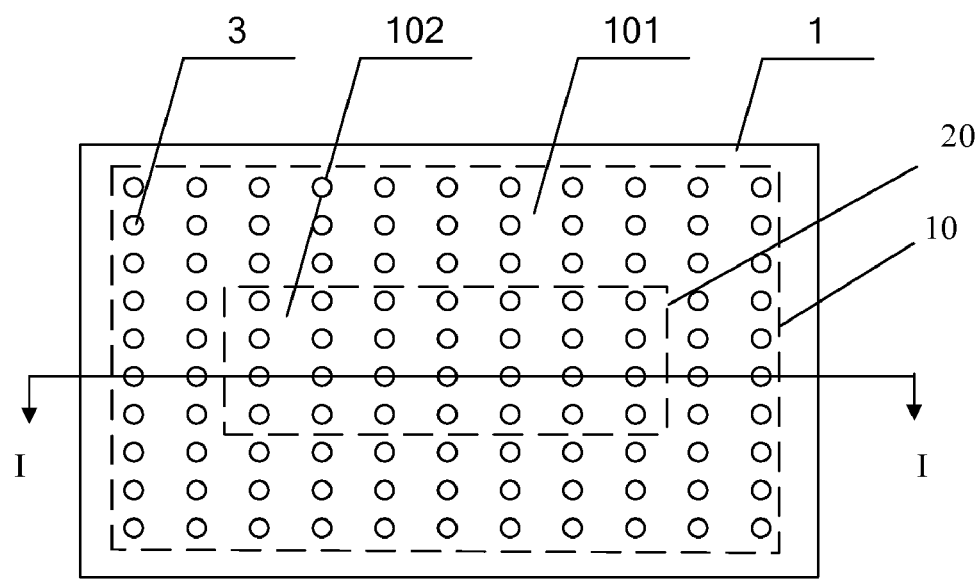
FIG. 1 is a schematic plan view of a structure according to an embodiment of the present invention.
Figure 2:
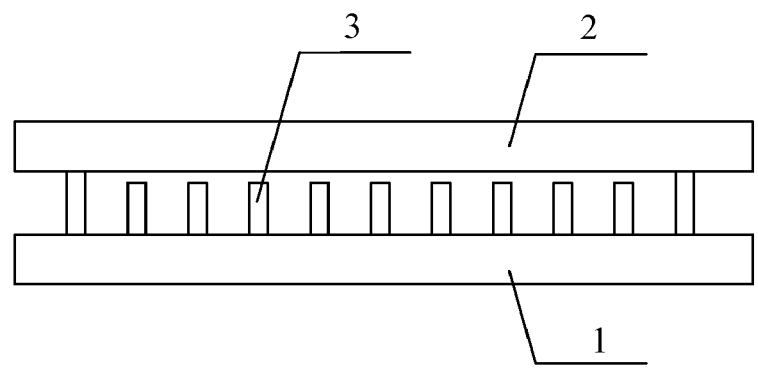
FIG. 2 is a sectional elevation view of the structure in FIG. 1 taken along line I-I.
Figure 3:
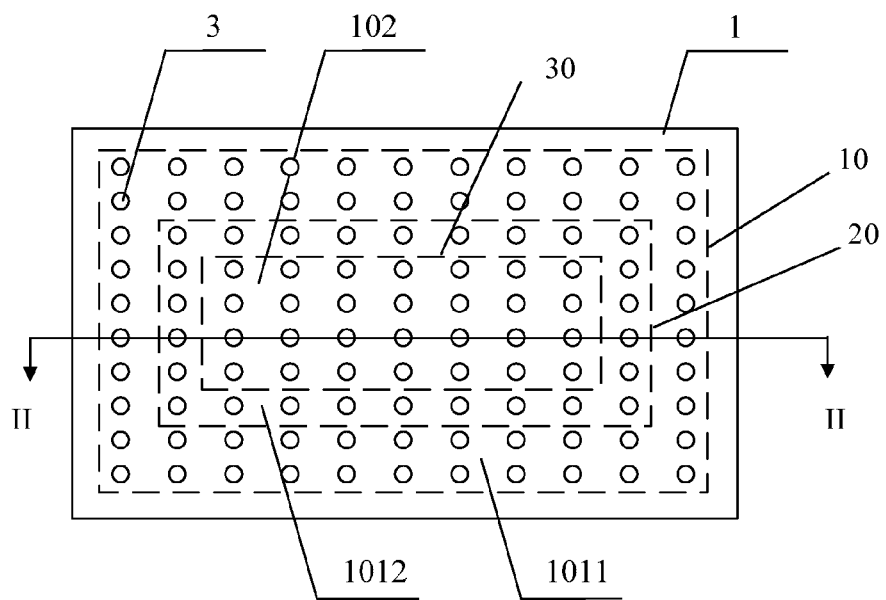
FIG. 3 is a schematic plan view of a structure with a buffer area according to another embodiment of the present invention.
Figure 4A:
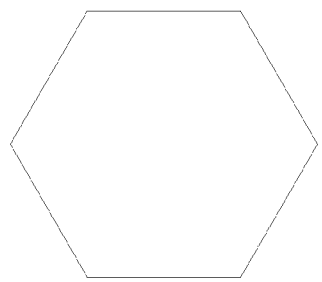
FIG. 4A is a schematic plan view of hexagon-shaped central and periphery areas according to an embodiment of the present invention.
Figure 4B:
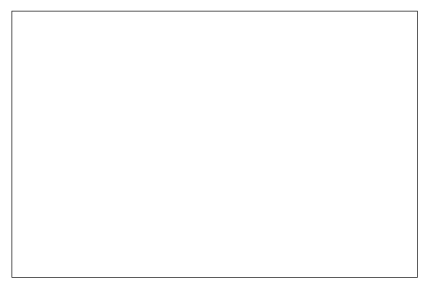
FIG. 4B is a schematic plan view of rectangle-shaped central and peripheral areas according to an embodiment of the present invention.
Figure 4C:
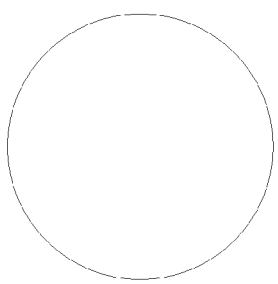
FIG. 4C is a schematic plan view of circle-shaped central and peripheral areas according to an embodiment of the present invention.
Figure 4D:
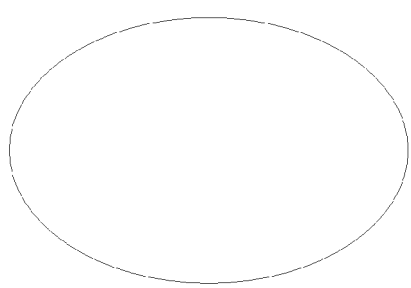
FIG. 4D is a schematic plan view of ellipse-shaped central and peripheral areas according to an embodiment of the present invention.

FIG. 1 is a schematic plan view of a structure of an embodiment of the present invention, and FIG. 2 is a sectional elevation view of the structure in FIG. 1 taken along line I-I. For simplicity and clearness, please note that the numbers of the spacers in FIG. 1 and FIG. 2 are not completely corresponding to each other. As shown in FIGS. 1 and 2, a liquid crystal cell of a liquid crystal display comprises a color filter substrate 1, a TFT array substrate 2, and spacers 3, and the spacers 3 are uniformly disposed on the color filter substrate 1 and interposed between the color filter substrate 1 and the TFT array substrate 2 so as to separate the two substrates apart and maintain a certain distance therebetween. In another embodiment, the spacers are provided on the array substrate and between the two substrates. The color filter substrate 1 comprises a peripheral area 101 and a central area 102, and the spacers 3 are uniformly disposed within the peripheral area 101 and the central area 102. Furthermore, the spacers 3 disposed in the peripheral area 101 are higher than those disposed in the central area 102. In FIG. 3, the spacers are formed as column spacers.

In FIG. 1, on the color filter substrate 1, an outer dash frame 10 indicates the outer periphery line of a display area of the color filter substrate 1, and dash frame 20 indicates the boundary line between the peripheral area 101 and the central area 102. Although no spacers are shown located outside of the display area, the present invention is not limited thereto. Preferably, spacers are disposed outside of the display area so as to more properly maintain cell gap between the two substrates, and such spacers are the same as those in the peripheral area 101.

An embodiment of the present invention provides a liquid crystal cell of a liquid crystal display having spacers with different heights. The peripheral mura and gravity mura phenomenon can be effectively resolved by setting the spacers in the peripheral area higher than those in the central area. The main reason causing the peripheral mura phenomenon lies in that the spacers disposed in the peripheral area can not maintain the gap of the liquid crystal cell, that is, the height of the spacers in the peripheral area is less than the gap of the liquid crystal cell. In the embodiments of the present invention, the spacers in the peripheral area are set higher than those in the central area, and the gap of the liquid crystal cell is inconsistent with the height of the spacers in the peripheral area, therefore the spacers in the peripheral area can effectively maintain the gap of the liquid crystal cell and prevent liquid crystal from excessively building up in the peripheral area so as to effectively reduce the peripheral mura phenomenon. On the other hand, since the spacers in the peripheral area are higher than those in the central area, the spacers in the peripheral area may be pressed against and suffer from spacer deformation. Therefore, the liquid crystal in the peripheral area is subject to more pressure than those in the central area. As a result, the liquid crystal may not be displaced by the gravity field even if the liquid crystal display operates in a high temperature so as to prevent occurrence of the gravity mura phenomenon.

FIG. 3 is a schematic plan view of the structure with a buffer area according to an embodiment of the present invention. As shown in FIG. 3, the peripheral area 101 is further divided into an edge area 1011 and a buffer area 1012. The edge area 1011 is disposed at the outmost periphery of the substrate, and the buffer area 1012 is disposed between the edge area 1011 and the central area 102. In FIG. 3, on the color filter substrate 1, an outer dash frame 10 indicates the outer periphery line of an display area of the color filter substrate 1, the intermediate dash frame 20 indicates the boundary line between the edge area 1011 and the buffer area 1012 of the peripheral area 101, and the inner dash frame 30 indicates the boundary line between the peripheral area 101 and the central area 102. Similarly, spacers that are the same as those in the edge area 1011 may be disposed outside of the display area.

The spacers with the same height are uniformly disposed in the edge area 1011 and the buffer area 1012, respectively, but the spacers disposed in the edge area 1011 are higher than those in the buffer area 1012, and the spacers disposed in the buffer area 1012 are higher than those in the central area 102. The buffer area 1012 effectively avoids a sharp change of height difference between the spacers, so as to more effectively prevent gap mura phenomenon. The gap mura phenomenon refers to the situation that liquid crystal is excessively built up due to a large height difference between the adjacent spacers, causing mura phenomenon there. Furthermore, there may be one or more the edge areas 1011 as shown in FIG. 3.

The spacers with different height may be formed through a mask process. A mask plate is provided with openings having different diameters from each other for forming the spacers. For example, the diameter of the opening for the spacers in the peripheral region 101 is set to be 10 μm, and the diameter of the opening for the spacers in the central region 102 is set to be 11 μm. With such configuration, the height difference between the spacers formed in the peripheral area 101 and those formed in the central area 102 is less than or equal to 0.05 μm. That is to say, the height of the spacers can be controlled by adjusting the diameters of the openings of a mask plate.

FIG. 4A~4D are schematic plan views of shapes of the central area and the peripheral area according to embodiments of the present invention. The central area 102 and the peripheral area 101 may be in a hexagon shape as shown in 4A, a rectangle shape as shown in 4B, a circle shape as shown in 4C, and an ellipse shape as shown in 4D as necessary. In addition, the peripheral area 101 and the central area 102 also may be in other shapes. The peripheral area 101 and the central area 102 may be in different shapes from each other. Furthermore, shapes among two edge areas 1011 or shapes of the edge area 1011 and the buffer area 1012 in the peripheral area 101 also can be the same or different.

Figure 5:
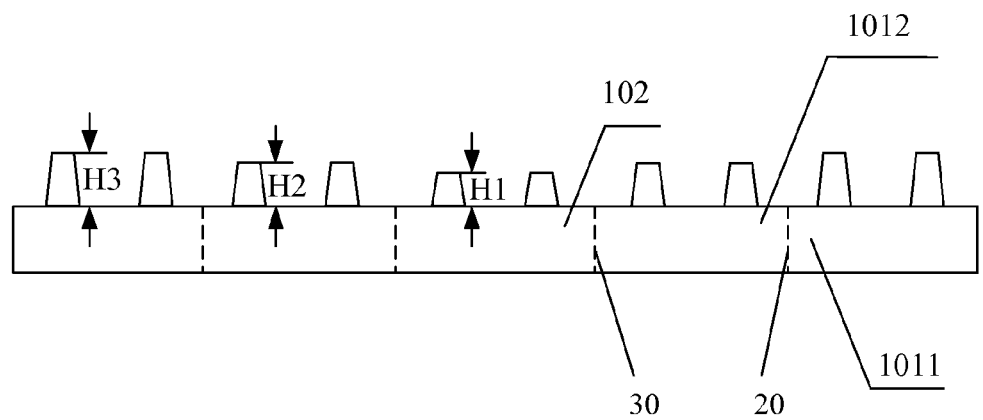
FIG. 5 is a sectional elevation view of the structure in FIG. 3 taken along line II-II.

FIG. 5 is a sectional elevation view of the structure in FIG. 3 take along line II-II. In FIG. 5, the boundary lines 20 and 30 are also shown for clearness, and also please note that the numbers of the spacers in FIG. 3 and FIG. 5 are not completely corresponding to each other. As shown in FIG. 5, the height of the spacers provided in the central area 102 is H1, the height of the spacers provided in the buffer area 1012 is H2, and the height of the spacers provided in the edge area 1011 is H3. The height difference between the spacers in two adjacent areas is less than or equal to 0.05 μm. That is, H1 is less than H2, and the height difference between H1 and H2 is less than or equal to 0.05 μm; H2 is less than H3, and the height difference between H2 and H3 is less than or equal to 0.05 μm. Moreover, the largest height difference between the spacers in the central area 102 and those in the peripheral area 101 is less than or equal to 0.1 μm. Furthermore, when the height difference between the spacers in the central area 102 and those in the peripheral area 101 is small (e.g., less than or equal to 0.05 μm), the gap mura phenomenon may be prevented. In FIG. 5, the column spacers have a tapered outline different that shown in FIG. 2.

Figure 6A:
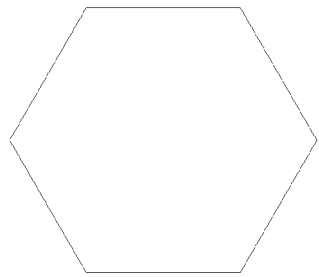
FIG. 6A is a schematic plan view of a spacer in a hexagon section according to an embodiment of the present invention.
Figure 6B:
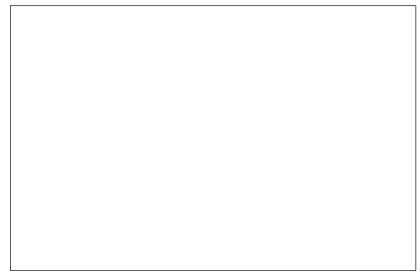
FIG. 6B is a schematic plan view of a spacer in a quadrangle section according to an embodiment of the present invention.
Figure 6C:
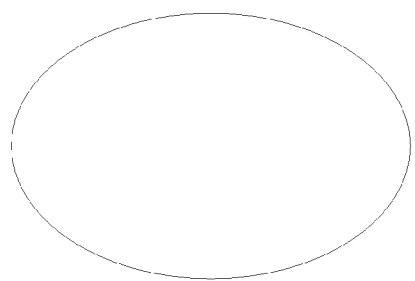
FIG. 6C is a schematic plan view of a spacer in an ellipse section according to an embodiment of the present invention.
Figure 6D:
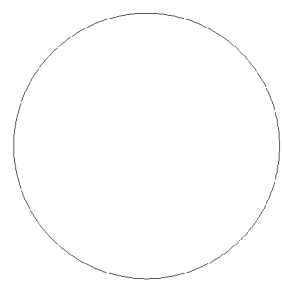
FIG. 6D is a schematic plan view of a spacer in a circle section according to an embodiment of the present invention.

FIG. 6A~6D are schematic plan views of the cross-section of spacers according to embodiments of the present invention. In practice, the spacers may be in a hexagon shape as shown in FIG. 6A, a rectangle shape as shown in FIG. 6B, an ellipse shape as shown in FIG. 6C, and a circle shape as shown in FIG. 6D as necessary. Moreover, the cross-sections of the spacers also may be in other shapes, and the cross-sections of the spacers provided in the same area may be different from each other.

Although the present invention has been described in detail referring to the preferred embodiments, the above embodiments are used only for illustration and not for the purpose of limitation. Accordingly, it will be understood by those of ordinary skill in the art that it is possible to use other materials and equipments if necessary, and that various modifications or equivalent alterations may be made to the embodiments of the present invention without departing from the spirit and scope of the present invention as set forth in the following claims.

What is claimed is:

1. A liquid crystal cell of a liquid crystal display, comprising spacers disposed between a color filter substrate and an array substrate, wherein a display area of the color filter substrate comprises a central area and a peripheral area, and the spacers provided in the peripheral area are higher than those provided in the central area, wherein the spacers in the peripheral area are subject to more depression and the spacers in the central area are subject to less depression after the color filter substrate and the array substrate are bonded together to form the liquid crystal cell.

2. The liquid crystal cell of a liquid crystal display according to claim 1, wherein the peripheral area comprises an edge area and a buffer area provided between the central area and the edge area, and the spacers provided in the buffer area are higher than those provided in the central area and lower than those provided in the edge area.

3. The liquid crystal cell of a liquid crystal display according to claim 1, wherein the central area is in a shape selected from a group consisting of rectangle, circle, ellipse, and polygon.

4. The liquid crystal cell of a liquid crystal display according to claim 1, wherein the peripheral area is in a shape selected from a group consisting of rectangle, circle, ellipse, and polygon.

5. The liquid crystal cell of a liquid crystal display according to claim 2, wherein the edge area is in a shape selected from a group consisting of rectangle, circle, ellipse, and polygon.

6. The liquid crystal cell of a liquid crystal display according to claim 2, wherein the buffer area is in a shape selected from a group consisting of rectangle, circle, ellipse, and polygon.

7. The liquid crystal cell of a liquid crystal display according to claim 1, wherein the height difference between a highest spacer and a lowest spacer is less than or equal to 0.1 µm.

8. The liquid crystal cell of a liquid crystal display according to claim 1, wherein the height difference between the spacers provided in the central area and the peripheral area is less than or equal to 0.05 µm.

9. The liquid crystal cell of a liquid crystal display according to claim 2, wherein the height difference between the spacers provided in adjacent areas is less than or equal to 0.05 µm.

10. The liquid crystal cell of a liquid crystal display according to claim 1, wherein the cross-section of the spacer is in a shape selected from a group consisting of rectangle, circle, ellipse, and polygon.

11. A method for manufacturing a liquid crystal cell of a liquid crystal display, comprising providing spacers between a color filter substrate and an array substrate, wherein a display area of the color filter substrate comprises a central area and a peripheral area, and the spacers are formed in the peripheral area higher than those formed in the central area, wherein after the color filter substrate and the array substrate are bonded together to form the liquid crystal cell the spacers in the peripheral area are subject to more depression and the spacers in the central area are subject to less depression.

12. The method according to claim 11, wherein the peripheral area comprises an edge area and a buffer area provided between the central area and the edge area, and the spacers are formed in the buffer area higher than those provided in the central area and lower than those provided in the edge area.

13. The method according to claim 11, wherein the height difference between a highest spacer and a lowest spacer is less than or equal to 0.1 µm.

14. The method according to claim 11, wherein the height difference between the spacers provided in the central area and the peripheral area is less than or equal to 0.05 µm.

15. The method according to claim 12, wherein the height difference between the spacers provided in adjacent areas is less than or equal to 0.05 µm.

16. The method according to claim 11, wherein the spacers are formed in the peripheral area higher than those formed in the central area through a mask process.

17. The method according to claim 16, wherein diameters of openings for the spacers in a mask plate used in the mask process are adjusted to control diameters of the spacers to be formed.

18. The method according to claim 11, wherein the spacers are formed in the buffer area higher than those provided in the central area and lower than those provided in the edge area through a mask process.

19. The method according to claim 18, wherein diameters of openings for the spacers in a mask plate used in the mask process are adjusted to control diameters of the spacers to be formed.

* * * * *